United States Patent [19]

Thomas et al.

[11] 4,254,015

[45] Mar. 3, 1981

[54] POLYCARBONATE CONTAINING AN AROMATIC SULFONAMIDE AS AN IGNITION DEPRESSANT

[75] Inventors: Lowell S. Thomas; Ronald V. Petrella, both of Midland, Mich.

[73] Assignee: The Dow Chemical Company, Midland, Mich.

[21] Appl. No.: 5,275

[22] Filed: Jan. 22, 1979

[51] Int. Cl.³ ............................................... C08K 5/16
[52] U.S. Cl. ........................ 260/45.9 R; 260/45.75 R; 260/45.8 RW; 528/172
[58] Field of Search ............ 260/37 PC, 30.2, 30.8 R, 260/45.8 R, 45.8 RW, 45.9 R, 45.9 QA, 45.75 R, 45.75 S, 45.9 NC; 528/172

[56] References Cited

U.S. PATENT DOCUMENTS

| | | | |
|---|---|---|---|
| 3,186,961 | 6/1965 | Sears et al. | 260/31.4 R |
| 3,951,910 | 4/1976 | Mark | 260/45.9 NC |
| 4,013,621 | 3/1977 | Knell | 260/45.9 R |
| 4,135,028 | 1/1979 | Hiestand et al. | 260/45.9 R |

*Primary Examiner*—Donald E. Czaja
*Assistant Examiner*—W. Thompson

[57] ABSTRACT

A polycarbonate such as a bisphenol-A homopolycarbonate containing a small amount of a metal salt of an aromatic sulfonamide, e.g., the sodium salt of saccarin or a derivative thereof, resists combustion upon exposure to a low temperature ignition source.

6 Claims, No Drawings

POLYCARBONATE CONTAINING AN AROMATIC SULFONAMIDE AS AN IGNITION DEPRESSANT

DESCRIPTION OF THE INVENTION

This invention relates to polycarbonates containing additives which inhibit combustion upon exposure of the polycarbonates to low temperature ignition sources.

Polycarbonates derived from reactions of dihydroxy-organic compounds, particularly the dihydric phenols, and carbonic acid derivatives such as phosgene have found extensive commercial application because of their excellent physical properties. These thermoplastic polymers appear to be particularly suitable for the manufacture of molded parts wherein impact strength, rigidity, toughness, heat resistance and excellent electrical properties are required.

Unfortunately, however, these polymers exhibit a brief but definite burning time when contacted with an open flame or comparable low temperature ignition source. More importantly, as is often the case, the polycarbonates contain stabilizers and other additives which are often more combustible than the unmodified polycarbonate. As a result, the modified polycarbonate frequently exhibits substantially poorer resistance to combustion than does the unmodified polycarbonate.

In attempts to increase the combustion resistance of polycarbonates including modified forms thereof, it has been a common practice to employ monomeric phosphites, phosphoric acid esters, thiophosphoric acid esters containing halogenated alkyl radicals and halogenated organic compounds into the polycarbonate. However, in order to obtain any noticeable improvement in combustion resistance, these additives have been employed in such large quantities that they often adversely affect many of the desirable physical and mechanical properties of the polycarbonate.

More recently, for example as taught in U.S. Pat. No. 3,919,167, various organo sulfonate salts have been employed as fire retardant additives for the polycarbonates. While these materials do not have a substantial deleterious effect on the physical properties of the polycarbonate, they generally must be employed in concentrations of at least one weight percent based on the polycarbonate in order to obtain a material that does not exhibit flaming drips upon combustion.

In view of the deficiencies of conventional fire retardant polycarbonate compositions, it would be highly desirable to provide a polycarbonate composition having improved resistance to burning when exposed to a low temperature ignition source.

SUMMARY OF THE INVENTION

The present invention is a polycarbonate composition comprising a carbonate polymer having dispersed therein an aromatic sulfonamide or a metal salt thereof in an amount sufficient to retard combustion when the composition is exposed to a low temperature ignition source. Hereinafter, such composition shall be referred to as a fire retardant polycarbonate. The aromatic sulfonamide employed in the fire retardant polycarbonate advantageously has at least one sulfonamide moiety represented by the formula:

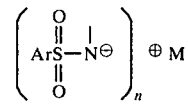

wherein Ar is an aromatic group, M is hydrogen or a cation and n is a number corresponding to the valence of M. The fire retardant polycarbonate of the present invention exhibits surprisingly high resistance to combustion and physical properties comparable to the carbonate polymer containing no sulfonamide additive.

The fire retardant polycarbonate of the present invention is suitably employed in most applications which polycarbonates have been previously utilized. Applications of particular interest for the utilization of the fire retardant polycarbonates of this invention are as follows: automobile parts, e.g., air filters, fan housings, exterior components; housings for electrical motors, appliances, business and office equipment, and photographic equipment, lighting and aircraft applications.

In general, such fire retardant polycarbonates are particularly useful in applications wherein the polycarbonate part is likely to be exposed to low temperature ignition sources.

DETAILED DESCRIPTION OF THE EMBODIMENTS

The carbonate polymers employed in the present invention are advantageously aromatic carbonate polymers such as the trityl diol carbonates described in U.S. Pat. Nos. 3,036,036; 3,036,037; 3,036,038 and 3,036,039; polycarbonates of bis(ar-hydroxyphenyl)alkylidenes (often called bisphenol-A type diols) including their aromatically and aliphatically substituted derivatives such as disclosed in U.S. Pat. Nos. 2,999,835; 3,038,365 and 3,334,154; and carbonate polymers derived from other aromatic diols such as described in U.S. Pat. No. 3,169,121.

It is understood, of course, that the carbonate polymer may be derived from two or more different dihydric phenols or a copolymer of a dihydric phenol with a glycol or with a hydroxy or acid terminated polyester or with a dibasic acid in the event of a carbonate copolymer or interpolymer rather than a homopolymer is desired. Also suitable for the practice of this invention are blends of any one of the above carbonate polymers. Also included in the term "carbonate polymer" are the ester carbonate copolymers of the types described in U.S. Pat. Nos. 3,169,121 and 4,105,633. Of the aforementioned carbonate polymers, the polycarbonates of bisphenol-A and derivatives, including copolycarbonates of bisphenol-A, are preferred. Methods for preparing carbonate polymers for use in the practice of this invention are well known, for example, several suitable methods are disclosed in the aforementioned patents which are hereby incorporated by reference in their entirety.

While the non-ionic aromatic sulfonamides are suitable in the practice of this invention, the salt form of aromatic sulfonamides are preferably employed and are those represented by the formula:

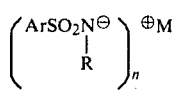

(II)

wherein Ar is a monovalent carbocyclic aromatic moiety, R is a monovalent organic moiety, especially one containing a sulfonyl or carbonyl which is bonded to the anionic nitrogen, or Ar and R are collectively a divalent aromatic moiety, especially one containing sulfonyl or carbonyl, both valencies of which divalent moiety are bonded to the anionic nitrogen, M is a cation, preferably a monovalent cation, and n is a number corresponding to the valence of M. Representative preferred sulfonamide salts are those in which Ar is phenyl, aromatically substituted phenyl, phenylene or aromatically substituted phenylene wherein the substituent(s) are halo, alkyl, aryl, amimo, including N-alkyl amino and N,N-dialkyl amino, alkyl carbonyl, alkaryl, aralkyl and the like; R is carbonyl, aromatic carbonyl such as arylcarbonyl (e.g., benzoyl), arylaminocarbonyl (e.g., benzylaminocarbonyl); aromatic sulfonyl such as arylsulfonyl (e.g., tolylsulfonyl), thiazolyl including alkylthiazolyl, pyrimidinyl including alkyl pyrimidinyl, quinolinyl and pyrrolidinyl, thiadiazolyl including alkyl thiadiazolyl and comparable monovalent organic moieties that are inert to the sulfonamide moiety; and M is ammonium or an alkali metal cation. Alternatively, M is a divalent cation, preferably derived from the alkaline earth metals, e.g., calcium, magnesium, etc., or a multivalent cation obtained from iron, copper, zinc and the like.

Especially preferred aromatic sulfonamide salts include the heterocyclic sulfonamide salts wherein Ar and R taken collectively are phenylenecarbonyl

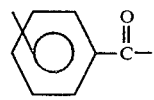

and ar-substituted phenylenecarbonyl such as ar-methylphenylenecarbonyl

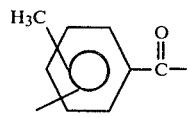

and ar-chlorophenylenecarbonyl and M is sodium.

Specific examples of preferred and other suitable sulfonamides include the salt forms (especially the sodium salt forms) of the following sulfonamides: (N-benzoyl)sulfanilamide, N-(2-thiazolyl)sulfanilamide, N-(2-4-methylpyrimidinyl))sulfanilamide, N-(5-methyl-,3,4-thiadiazol-2-yl)sulfanilamide, N-(6-methoxy-2-methyl-4-pyrimidinyl)sulfanilamide, N-(5-methyl-3-isoxazolyl)sulfanilamide, N-(6-methoxy-3-pyridazinyl)-sulfanilamide, N-(2-quinoxalinyl)sulfanilamide, N-(5-chloro-2-pyrazinyl)sulfanilamide, saccharin

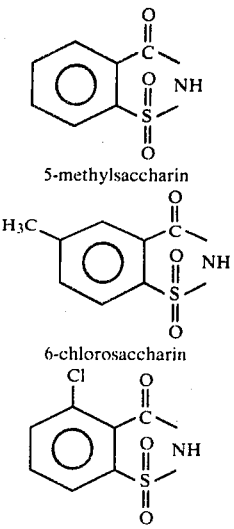

with the saccharin and substituted saccharin being preferred. While saccharin and other similar compounds having the sulfonamide moiety,

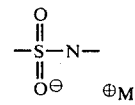

embodied in a heterocyclic ring are technically sulfimides, they are included within the term "aromatic sulfonamide" for the purposes of this invention.

Methods for preparing the aromatic sulfonamides to be employed in the practice of this invention are described in Kirk-Othmer, *Encyclopedia of Chemical Technology*, 2nd Edition, Vol. 19, Wiley & Sons Inc., New York (1969) at pp 257-258 and Kharasch, *Organic Sulfur Compounds*, Pergamon Press Inc., New York (1961) at pp 561-562.

The fire retardant polycarbonate of the present invention is suitably prepared by combining the carbonate polymer with an effective amount of sulfonamide using any one of a variety of blending procedures conventionally employed for incorporating additives into carbonate polymer resins. For example, dry particulates of the carbonate polymer and the sulfonamide may be dry blended and the resulting dry blend extruded into the desired shape.

While any amount of sulfonamide that imparts to the polycarbonate an improved resistance to ignition and/or combustion is suitable, preferred amounts of the sulfonamide are in the range from about 0.001 to about 2, especially from about 0.01 to about 0.5, weight percent based on the weight of the polycarbonate.

In addition to the aforementioned sulfonamide, other additives may be included in the fire retardant polycarbonate of the present invention such as fillers, pigments, dyes, antioxidants, stabilizers, ultraviolet light absorbers, mold release agents and other additives commonly employed in polycarbonate resin formulations.

The following examples are given to further illustrate the invention and should not be construed as limiting its scope. In the following examples, all parts and percentages are by weight unless otherwise indicated.

EXAMPLE 1

To a 3000-g sample of a homopolycarbonate of bisphenol-A, having a weight average molecular weight ($M_w$) of 32,000 as determined by gel permeation chromatography and sold under the trade name Lexan 100-111 by General Electric, in the form of pellets (0.32 cm(dia)×0.32 cm (length)) is added 0.3 g of the sodium salt of saccharin. These ingredients are dry blended and then dried at 250° F. for four hours. The resultant blend is extruded and repelletized in a single screw extruder operating at 500° F. The extruded pellets are redried at 250° F. for up to four hours. These redried pellets are molded into test bars (12.7 cm×1.27 cm×0.32 cm) using a screw type injection molding unit wherein the molding temperature is 550° F. The injection molded bars are tested for combustibility (oxygen index and fire retardance). The results of these tests (Sample No. 1) are reported in Table I.

For the purposes of comparison, two additional blends (Sample Nos. 2 and 3) are prepared using different amounts of the sodium salt of saccharin. These blends are also tested and the results are reported in Table I. Also for comparison, six blends (Sample Nos. 4–9) are prepared using two different sulfonamides and tested. The results of these tests are reported in Table I. Also recorded in Table I are two control samples (Sample Nos. C₁ and C₂) employing no fire retardant additive.

TABLE I

| Sample No. | Aromatic Sulfonamide(1) Type | Aromatic Sulfonamide(1) Amount, % | $O_2$ Index(2) % $O_2$ | Fire Retardance(3) Avg. Flame Time, Sec | Fire Retardance(3) Rating 2 Tests |
|---|---|---|---|---|---|
| C₁* | None | — | 27.9 | 9.3 | V-2,V-2 |
| 1 | NaS | 0.01 | 36.2 | 3.0 | V-0,V-0 |
| 2 | NaS | 0.10 | 38.4 | 1.3 | V-0,V-0 |
| 3 | NaS | 1.00 | 26.3 | 6.3 | V-2,V-2 |
| C₂* | None | — | 26.3 | 22.1 | HB,HB |
| 4 | TS | 0.01 | 30.9 | 6.6 | V-2,V-1 |
| 5 | TS | 0.10 | 27.1 | 14.7 | HB,V-2 |
| 6 | TS | 0.50 | 26.3 | 14.8 | HB,HB |
| 7 | SDZ | 0.01 | 35.6 | 3.4 | V-2,V-2 |
| 8 | SDZ | 0.10 | 41.1 | 4.1 | V-2,V-2 |
| 9 | SDZ | 1.00 | 26.3 | 8.2 | V-2,V-2 |

*Not an example of the invention. Burn characteristics of Sample Nos. C₁ and C₂ vary because each contains additives different from the other. Sample Nos. 1–3 are prepared from the polycarbonate composition used in Sample No. C₁ and Sample Nos. 4–9 are prepared using the polycarbonate composition of Sample No. C₂.
(1)NaS - sodium saccharin

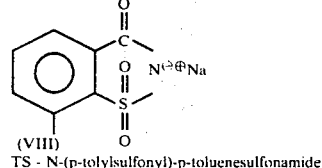

(VIII)
TS - N-(p-tolylsulfonyl)-p-toluenesulfonamide

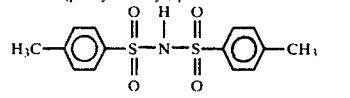

SDZ - N-(2-pyrimidinyl)sulfanilamide(sodium salt)

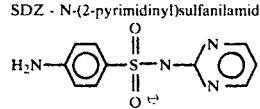

Amount - weight percent based on polycarbonate
(2)ASTM D-2863-70
(3)Underwriters Laboratories Standard Test UL-94

As evidenced by the data shown in Table I, the aromatic sulfonamides such as the alkali metal salts of saccharin and the other specified sulfonamides impart significant fire retardance to polycarbonates even at low levels of concentration such as 0.01%. In addition, the alkali metal salt forms of the sulfonamides are found to be more effective than the non-ionic sulfonamide.

EXAMPLE 2

To 3000 g of bisphenol-A homopolycarbonate ($M_w$=32,000 and sold by Mobay Chemical under the trade name Merlon M50F) in pellet form (0.32 cm (dia)×0.32 cm (length)) is added 0.3 g of the sodium salt of N-(p-tolylsulfonyl)-p-toluenesulfonamide in the form of a dry powder. These ingredients are dry blended, dried, extruded, repelletized, redried and injected molded into test bars by the procedures described in Example 1. Also following the procedure of Example 1, the resulting test bars are tested for oxygen index and flame retardance. The results of these tests are reported in Table II. Also for purposes of comparison different amounts of the aforementioned aromatic sulfonamide and other sulfonamides as indicated in Table II are similarly tested. The results of these tests are also reported in Table II.

TABLE II

| Sample No. | Aromatic Sulfonamide(1) Type | Aromatic Sulfonamide(1) Amount, % | $O_2$ Index(2), % $O_2$ | Fire Retardance(3) Avg. Flame Time, Sec | Fire Retardance(3) Rating 2 Tests |
|---|---|---|---|---|---|
| C₁* | None | — | 25.2 | 17.5 | HB,HB |
| 1 | NaTs | 0.01 | 29.4 | 8.8 | V-2,V-2 |
| 2 | NaTs | 0.05 | 38.6 | 2.5 | V-0,V-0 |
| 3 | NaTs | 0.10 | 39.2 | 1.3 | V-0,V-0 |
| 4 | NaUBS | 0.025 | 38.6 | 1.3 | V-2,V-2 |
| 5 | NaSTZ | 0.01 | 35.4 | 5.2 | V-2 |
| 6 | NaSTZ | 0.05 | 38.6 | 2.0 | V-0 |
| 7 | NaSTZ | 0.20 | 39.2 | 3.6 | V-2 |
| 8 | NaSMZ | 0.01 | 35.4 | 8.2 | V-2 |
| 9 | NaSMZ | 0.05 | 40.4 | 1.6 | V-0 |
| 10 | NaSMZ | 0.2 | 38.0 | 3.3 | V-0 |
| 11 | NaSBZ | 0.01 | 34.0 | 7.2 | V-2,V-2 |
| 12 | NaSBZ | 0.05 | 34.7 | 2.1 | V-2,V-2 |
| 13 | NaSBZ | 0.20 | 36.7 | 2.2 | V-2,V-2 |
| 14 | NaSCP | 0.01 | 34.7 | 3.3 | V-2,V-2 |
| 15 | NaSCP | 0.05 | 39.5 | 2.4 | V-2,V-2 |
| 16 | NaSCP | 0.20 | 38.6 | 1.9 | V-0,V-0 |
| C₂* | None | | | | |
| 17 | NaS | 0.005 | 27.8 | 10.9 | V-2 |
| 18 | NaS | 0.010 | 31.0 | 12.1 | V-2 |
| 19 | NaS | 0.020 | 33.3 | 9.1 | V-2 |
| 20 | NaS | 0.030 | 36.1 | 4.6 | V-2 |
| 21 | NaS | 0.040 | 36.1 | 4.0 | V-0 |
| 22 | NaS | 0.050 | 36.7 | 2.3 | V-0 |
| 23 | NaS | 0.100 | 36.1 | 3.0 | V-0 |

TABLE II-continued

| Sample No. | Aromatic Sulfonamide(1) Type | Amount, % | O₂ Index(2), % O₂ | Fire Retardance(3) Avg. Flame Time, Sec | Rating 2 Tests |
|---|---|---|---|---|---|
| 24 | NaS | 0.250 | 33.3 | 3.7 | V-2 |

Not an example of this invention. Burn characteristics of C₁ and C₂ vary because each contains different additives. Sample Nos. 1-10 are prepared from the polycarbonate composition used in Sample No. C₁ and Sample Nos. 11-18 are prepared using the polycarbonate composition of Sample No. C₂.

(1)NaS - sodium saccharin
NaTs - sodium salt of N-(p-tolylsulfonyl)-p-toluenesulfonamide
NaUBS - sodium salt of N-(N'-benzylaminocarbonyl)sulfanilamide

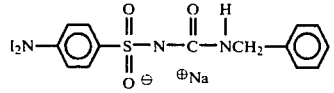

NaSTZ - Sodium Salt of N-(2-thiazolyl)sulfanilamide

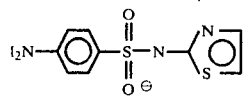

NaSMZ - Sodium salt of N-(2-(4-methylpyrimidinyl)sulfanilamide

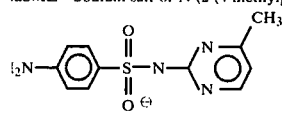

NaSBZ - sodium salt of N-(phenylcarbonyl)-sulfanilamide

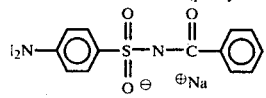

Na SCP - sodium salt of N-(5-chloro-2-pyrazinyl)sulfanilamide

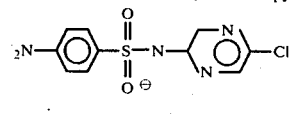

(2)Same as (2) in Table I
(3)Same as (3) in Table I

What is claimed is:

1. A composition comprising a carbonate polymer having dispersed therein a metal salt of an aromatic sulfonamide having at least one sulfonamide moiety represented by the formula:

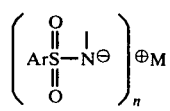

wherein Ar is an aromatic group, M is a metal cation and n is a number corresponding to the valence of M.

2. The composition of claim 1 wherein the sulfonamide is represented by the formula:

wherein Ar taken singularly is an aromatic carbocyclic moiety and R is a monovalent organic moiety or taken collectively Ar and R are a divalent aromatic moiety wherein both valencies are bonded to the —N⊖— and M⊕ is a monovalent cation.

3. The composition of claim 2 wherein the monovalent cation is sodium, Ar is phenyl, aromatically substituted phenyl, phenylene or aromatically substituted phenylene in which the substituent(s) are halo, alkyl, aryl, amino, alkylcarbonyl, alkaryl or aralkyl; R' is carbonyl, aryl carbonyl, aryl aminocarbonyl, aryl sulfonyl, thiazolyl, alkyl thiazolyl, pyrimidinyl, alkyl pyrimidinyl, quinolinyl or pyrrolidinyl.

4. The composition of claim 3 wherein the sulfonamide is represented by the formula:

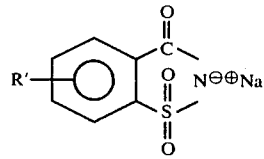

wherein R' is halo, hydrogen or alkyl.

5. The composition of claim 3 wherein the sulfonamide is represented by the formula:

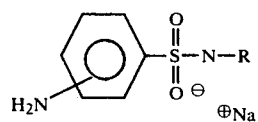

wherein R is aryl carbonyl, aryl amino carbonyl, aryl sulfonyl, thiazolyl, alkyl thiazolyl, pyrimidinyl, alkyl pyrimidinyl, quinolinyl or pyrrolidinyl.

6. The composition of claim 1 wherein the carbonate polymer is a polycarbonate of bisphenol-A and the sulfonamide is the sodium salt of saccharin, said salt being present in an amount from about 0.01 to about 0.5 weight percent based on the weight of the polycarbonate.

* * * * *